United States Patent [19]

Crowhurst

[11] Patent Number: 4,835,811

[45] Date of Patent: Jun. 6, 1989

[54] BRUSHING AND WASHING MACHINE

[76] Inventor: Arthur G. Crowhurst, P.O. Box 511, Waikerie, South Australia, Australia, 5330

[21] Appl. No.: 171,832

[22] Filed: Mar. 22, 1988

[51] Int. Cl.⁴ .............................................. A47L 11/38
[52] U.S. Cl. .................................. 15/21 E; 15/50 C; 15/53 A; 15/56
[58] Field of Search .............. 15/DIG. 2, 21 E, 50 C, 15/49 C, 53 A, 56, 97 R, 98, 97 B

[56] References Cited

U.S. PATENT DOCUMENTS

| | | | |
|---|---|---|---|
| 2,636,198 | 4/1953 | Wilson | 15/53 A |
| 2,854,680 | 10/1958 | Wilson . | |
| 2,876,472 | 3/1959 | Rousseau | 15/53 A |
| 2,950,492 | 8/1960 | Liekweg | 15/53 A |
| 3,680,164 | 8/1974 | Hartunian . | |
| 3,830,430 | 8/1972 | Thornton-Trump . | |

FOREIGN PATENT DOCUMENTS

| | | |
|---|---|---|
| 2902027 | 8/1980 | Fed. Rep. of Germany . |
| 3311547 | 10/1984 | Fed. Rep. of Germany . |
| 3403415 | 10/1984 | Fed. Rep. of Germany . |
| 0556785 | 7/1977 | U.S.S.R. ............................. 15/53 A |

Primary Examiner—Edward L. Roberts
Attorney, Agent, or Firm—Cushman, Darby & Cushman

[57] ABSTRACT

A mobile washing machine for washing vertical surfaces includes a brush rotatable about a vertical axis mounted on a framework adapted to be carried on the forks of a fork lift truck. The framework carries a tank for the washing fluid and a pump to pump the fluid to a series of spray nozzles. The brush is driven by a hydraulic motor supplied with hydraulic fluid from the hydraulic system on the fork lift truck.

1 Claim, 2 Drawing Sheets

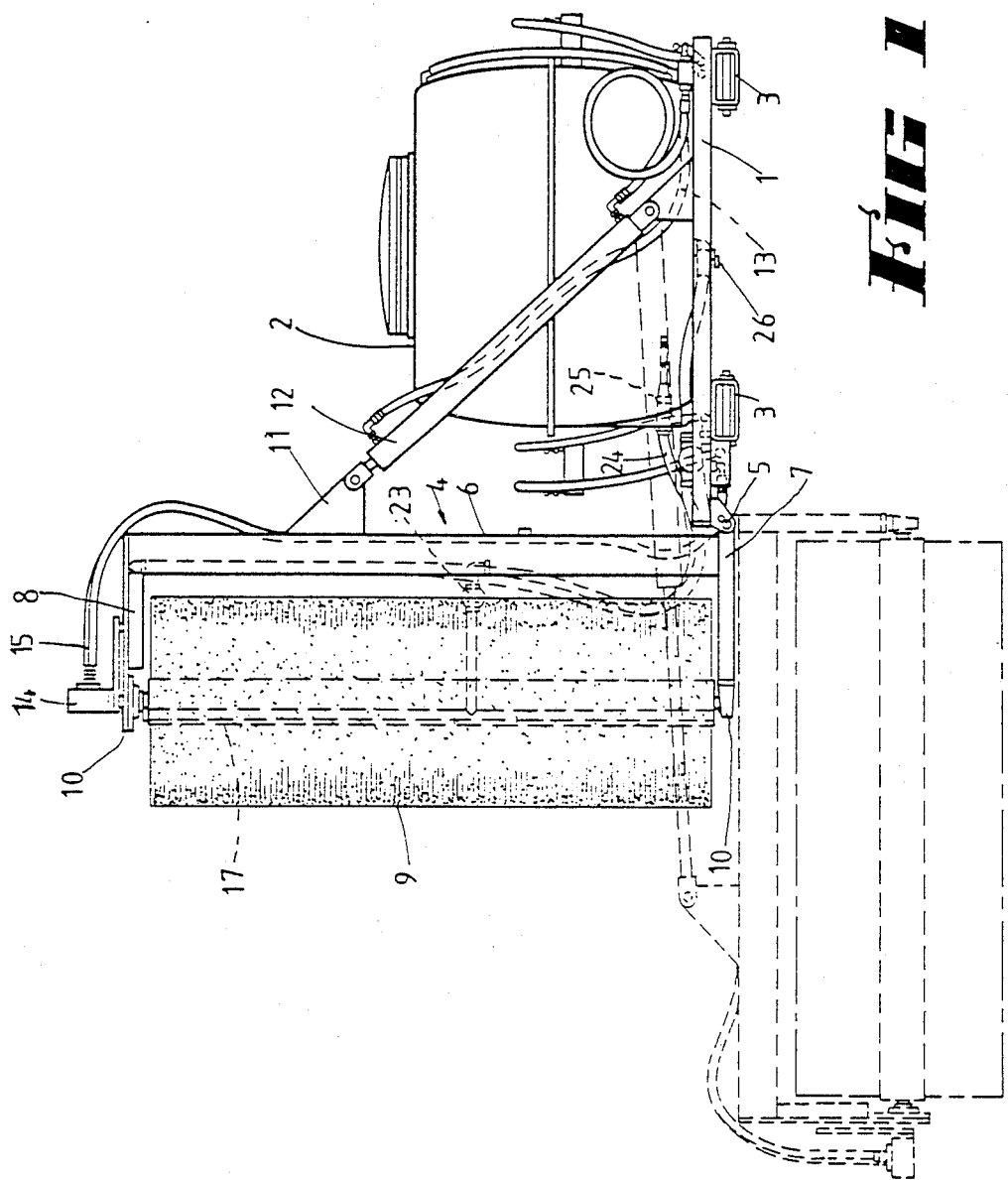

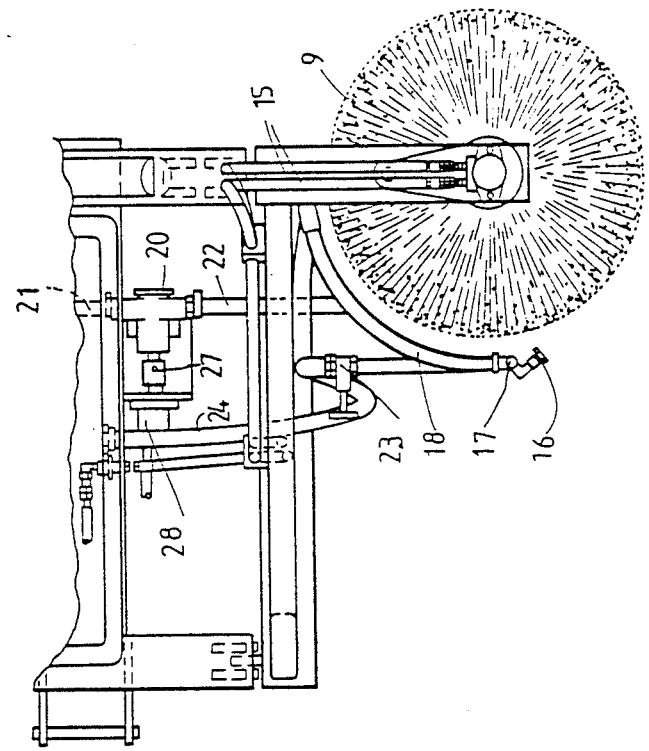
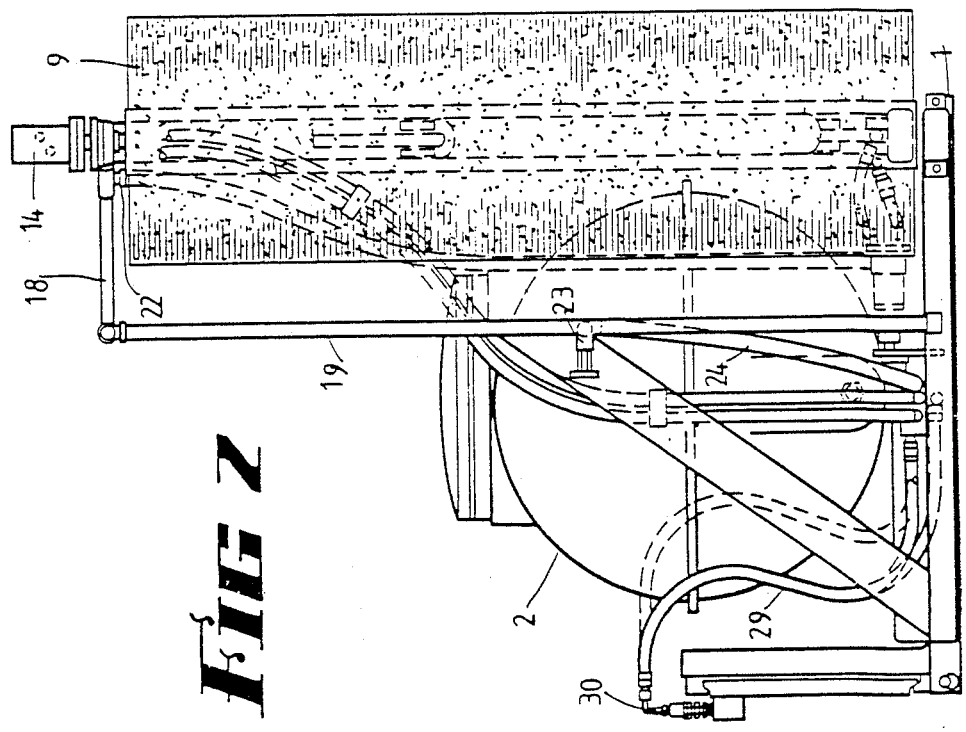

BRUSHING AND WASHING MACHINE

BACKGROUND OF THE INVENTION

This invention relates to a brushing and washing machine, more particularly to a machine for the cleaning of vertical and horizontal surfaces such as the walls and tops of shipping containers, transport vehicles, and walls of buildings.

Conventionally, vertical surfaces such as the side walls of shipping containers, transport vehicles such as furniture removal vans, refrigerated vans and the walls of buildings are cleaned manually by the use of a high pressure water jet and a broom or the like. High pressure water jets are suitable for removing a great deal of the loose grime which accumulates on such vehicles and containers and buildings, but a broom or some brushing means is required to remove the film of grime which adheres to the surfaces.

U.S. Pat. No. 2,636,198 discloses a portable brushing machine for washing vehicles of the type for transport to and from a vehicle, the machine being carried on the forks of a fork lift truck. The machine has a water storage tank, a pump and valve arrangement to deliver water spray to a brush rotatable on a vertical axis, the brush mounted on a vertically reciprocal bar. A power unit is provided on the tank to drive the hydraulic pump to rotate the brush and vertically reciprocate the bar, and lever control means to automatically control the operation.

U.S. Pat. No. 2,950,492 discloses a portable vehicle washing machine mounted on a road transport vehicle, the machine having a cylindrical brush rotatable about a vertical axis.

The brush can be moved laterally and transversely of the vehicle, and the brush is mounted on a carriage so that the brush tends to move the working position to provide a constant pressure on the surface being washed.

U.S. Pat. No. 2,854,680 shows a vehicle washing machine wherein the brush is suspended from an overhead rail. This unit is not mobile and cannot be taken to the washing area.

U.S. Pat. No. 2,876,472 discloses a portable washing and brushing machine mounted on a fork lift truck, the machine having a rotatable brush element which is vertically mounted on a shaft driven by a hydraulic motor. A series of spray nozzles are supplied with water from a pump driven by a belt.

U.S. Pat. No. 3,680,164 discloses a mobile machine for cleaning the external surfaces of an aircraft, a brush being mounted on an articulated arm. Similarly U.S. Pat. No. 3104406 has brushes mounted on a articulated arm for cleaning road transport vehicles.

DE No. 3311547, DE No. 3403415 and DE No. 2902027 also show vertical brushes for cleaning the side walls of vehicles.

U.S. Pat. No. 3,830,430 shows a machine for cleaning the inside of a vehicle.

SUMMARY OF THE INVENTION

It is an object of this invention to provide a portable brushing and washing machine which is suitable for the cleaning of vertical surfaces and also which can clean the top surfaces of large covered transport vehicles.

Thus, there is provided according to the invention a brushing and washing machine, the machine being mounted on a mobile vehicle such as a forklift truck to provide vertical movement of the machine, the machine comprising a rotatable brush, a series of spray nozzles, and a tank for the supply of water and detergent, a pump to supply the water from the tank to the spray nozzles, a hydraulic motor driving the brush at one end, the brush at its other end driving the pump.

BRIEF DESCRIPTION OF THE DRAWINGS

FIG. 1 is a front elevation of the machine,
FIG. 2 is a side elevation thereof, and,
FIG. 3 is a partial plan view, parts of all drawings being omitted for the sake of clarity.

DETAILED DESCRIPTION

With reference to FIGS. 1 to 3, the apparatus comprises a base 1 on which the tank 2 is mounted, the base having fitted thereto channels 3 to receive the forks of the fork lift truck.

On one side of the base 1 there is pivoted frame 4 pivoted to the base 1 by a pivot pin 5. The frame 4 includes two members 6 and 7 at right angles to each other, the longer member 6 having an arm 8 attached thereto to extend parallel to the shorter member 7, a cylindrical brush 9 being mounted in bearings 10 between the member 7 and the arm 8.

The longer member 6 is attached to the bracket 11 having pivoted thereto a hydraulic ram 12 which, in turn, is pivoted to a bracket 13 mounted on the base 1.

Hence, it will be seen that the frame 4 together with the cylindrical brush 9 can be pivoted from a vertical position to the horizontal position shown in dotted lines in FIG. 1. In a horizontal position the brush thus extends away from the side of the base 1 so that, when lifted by a fork lift truck, the top of a ISO container or other enclosed transport vehicle can be washed.

The cylindrical brush 9 is driven at its upper end by a hydraulic motor 14 supplied by hydraulic fluid through hoses 15 which are adapted to be coupled to the hydraulic system of the fork lift truck.

Water is sprayed onto the brush through a series of nozzles 16 on a vertical spray pipe 17 connected to arcuate pipe 18 joined to a stand pipe 19. A pump 20 draws the water and detergent from the tank 2 through pipe 21 and delivers it through hose 22 to the top of the spray pipe 17.

Stand pipe 19 has connected thereto a valve 23 which is connected to a return pipe 24 which, in turn, is connected to a venturi mixing nozzle 25 in the tank 2. A gate valve 26 is provided in the inlet pipe 21 from tank 2 to the pipe 20. Thus, pump 20 delivers water to the spray nozzles, valve 23 being adjusted so that the desired pressure is available to the spray nozzle 16, the excess water and detergent being returned through and injection in the tank so that the detergent and water is continuously mixed and agitated.

The pump 20 is driven through a coupling 27 by a hydraulic motor 28, also connected by hydraulic hoses 29 to the hydraulic system of the fork lift truck, suitable quick connect couplings 30 being provided for the connection of the hydraulic hoses from the hydraulic hoses 14 and 28.

The hydraulic motor can be supplied with hydraulic fluid under pressure from the hydraulic system of the fork lift truck, and one convenient way of doing this is to disconnect one of the hydraulic controls from the hydraulic control valve and connect the hydraulic lines from the hydraulic motor to the control valve. The controls of a fork lift truck include a movement for side shifting, or a tilting or rotation movement, and one of these can be disconnected and have the hydraulic motor connected thereto while still allowing the raising and lowering of the fork lift mechanism. Preferably, a further control valve can be added to control the hydraulic motor, thus still allowing side shifting and tilting or rotation for controlling the position of the brush.

A spray-deflecting guard can be provided on the framework adjacent to the brush to prevent the spray from being carried back onto the fork lift truck and operator, this deflector extending from the spray line and back around the brush.

In operation, the brush can be rotated in either direction depending upon which direction is selected by the control valve.

A spring loaded reel can be provided on the framework around which the hydraulic lines can pass, thus allowing the fork lift to be raised and lowered as desired, the spring loaded reel taking up the slack in the hydraulic lines in the lower position and allowing the reel to unwind the hydraulic lines during the upward movement of the fork lift.

Thus, there is provided a versatile mobile unit for the cleaning of vertical surfaces, and, where the surfaces are ribbed, the fork lift can be tilted to a slight degree to allow the brush to more easily penetrate into the crevices adjacent the ribs, and by reversing rotation of the brush, as desired, effective cleaning of irregular surfaces can thus be obtained.

Thus, the unit can be taken to the vertical surfaces to be cleaned, and, with a shipping container, furniture removal van or the like, the vertical surfaces and horizontal top surfaces can be easily cleaned by taking the unit to the container or vehicle. The container itself can also be cleaned on the vehicle and does not have to be removed therefrom.

In an alternative arrangement, the drive can be provided by any other means, and, if desired a small internal combustion engine and hydraulic pump and hydraulic system can be mounted on the framework itself to produce a unit which can be operated without the requirement of the hydraulic connection to the hydraulics of the fork lift truck. In this respect, also, the driving motor could be a small electric motor which, of course, would have to be suitably shielded from the cleaning water.

I claim:

1. A mobile brushing and washing machine for brushing and washing vertical and horizontal surfaces comprising: a base; means on the base for receiving the forks of a forklift truck; a vertically disposed cylindrical brush rotatable about its axis for contacting a vertical surface to be brushed and washed, said brush having an axle means mounting the axle of the brush to a frame so that the brush protrudes from the base; a tank mounted on the base for containing wash liquid carried by the base; a pump mounted on the base and having an inlet connected to said tank and an outlet connected to a line which returns to the tank and which is connected to the bottom of the tank through a fitting which agitates liquid in the tank as pumped liquid flows through the fitting; a plurality of spray nozzles disposed adjacent the brush and connected to the line for spraying wash liquid onto a vertical or horizontal surface to be brushed and washed; an adjustable valve in the line at a location between the fitting and the spray nozzles for adjusting the pressure in the line and in the spray nozzles; a hydraulic motor mounted on the framework and axially above the axis of the brush and directly connected to the upper end of the axle of the brush for rotating the latter, a further hydraulic motor drivingly connected to the pump; hydraulic lines connected at one end to the hydraulic motors and having opposite ends connectable to a hydraulic pump on a fork lift truck; said frame being pivoted at its lower end to said base, a hydraulic ram extending between an upper portion of said frame and said base so that the frame and brush can be pivoted from a vertical position to a horizontal position to wash the upper surfaces of a transport vehicle.

* * * * *